US008509785B2

(12) United States Patent
Nylander et al.

(10) Patent No.: US 8,509,785 B2
(45) Date of Patent: Aug. 13, 2013

(54) METHOD AND ARRANGEMENTS IN A CELLULAR NETWORK WITH FEMTOCELLS

(75) Inventors: Tomas Nylander, Värmdö (SE); Johan Rune, Lidingö (SE); Jari Vikberg, Järna (SE); Arne Norefors, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 249 days.

(21) Appl. No.: 13/062,634

(22) PCT Filed: Nov. 18, 2008

(86) PCT No.: PCT/SE2008/051325
§ 371 (c)(1),
(2), (4) Date: Mar. 7, 2011

(87) PCT Pub. No.: WO2010/036167
PCT Pub. Date: Apr. 1, 2010

(65) Prior Publication Data
US 2011/0165878 A1 Jul. 7, 2011

Related U.S. Application Data

(60) Provisional application No. 61/099,432, filed on Sep. 23, 2008.

(51) Int. Cl.
*H04W 36/00* (2009.01)

(52) U.S. Cl.
USPC ............ 455/444; 455/438; 455/439; 455/443

(58) Field of Classification Search
USPC .......................................................... 455/444
See application file for complete search history.

(56) References Cited

U.S. PATENT DOCUMENTS 7,929,970 B1 * 4/2011 Gunasekara et al. ......... 455/444
2008/0220782 A1 * 9/2008 Wang et al. ................... 455/436

OTHER PUBLICATIONS

International Search Report for PCT/SE2008/051325, mailed Jun. 3, 2009.
Telecom Italia et al., "Pseudo-CR on Option C for CSG deployments", 3GPP Draft; C1-082792, No. Zagreb, Croatia, (Jun. 27, 2008), 12 pages.
T-Mobile et al., "Network support to ensure UE autonomous CSG discovery after change of macro cell identification", 3GPP Draft; R2-082138, (Apr. 28, 2008), 2 pages.
International Preliminary Report on Patentability mailed Apr. 7, 2011 in corresponding PCT Application No. PCT/SE2008/051325.

* cited by examiner

*Primary Examiner* — Huy C Ho
(74) *Attorney, Agent, or Firm* — Nixon & Vanderhye, P.C.

(57) ABSTRACT

The present invention provides method and arrangements for dynamically and automatically obtaining a macro layer TA footprint for a femtocell, i.e. the femtocell's location in relation to the macro layer TAs, and to use this information to minimize signaling load from Tracking Area Updating in conjunction with femtocells.

14 Claims, 8 Drawing Sheets

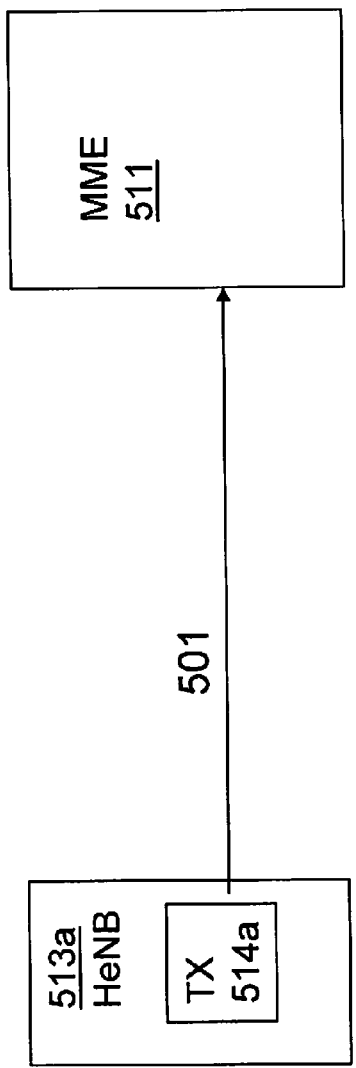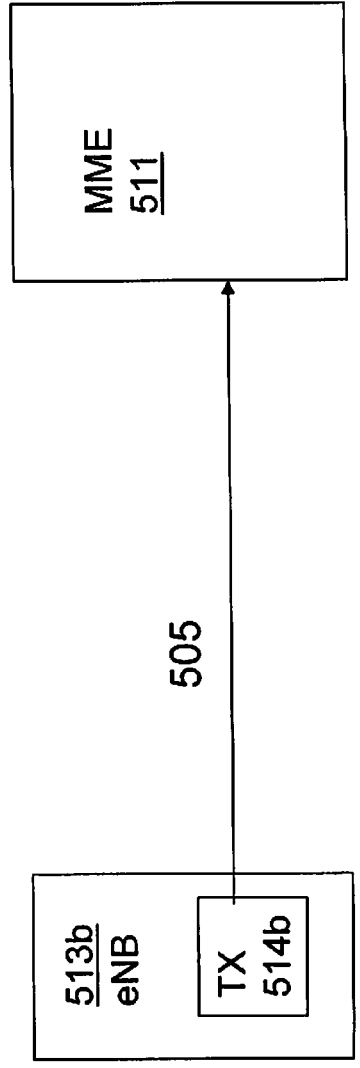

US 8,509,785 B2

METHOD AND ARRANGEMENTS IN A CELLULAR NETWORK WITH FEMTOCELLS

This application is the U.S. national phase of International Application No. PCT/SE2008/051325, filed 18 Nov. 2008, which designated the U.S., and claims the benefit of U.S. Provisional No. 61/099,432 filed 23 Sep. 2008, the entire contents of each of which are hereby incorporated by reference.

TECHNICAL FIELD

The present invention relates to method and arrangements for a cellular network, and in particular for a cellular network with femtocells.

BACKGROUND

In the Third Generation Partnership Project (3GPP), specification is ongoing for home base stations in Wideband Code Division Multiple Access/Universal Terrestrial Radio Access Network (WCDMA/UTRAN) and in E-UTRAN (Evolved Universal Terrestrial Radio Access Network). E-UTRAN is the next generation of Radio Access Network and another name used for E-UTRAN is the Long Term Evolution (LTE) Radio Access Network (RAN). The core network where E-UTRAN is connected to is called Evolved Packet Core (EPC), a.k.a. System Architecture Evolution (SAE) network. Both the E-UTRAN and the EPC comprise together the Evolved Packet System (EPS) that is also known as the SAE/LTE network. A base station in LTE is called eNodeB or eNB (E-UTRAN NodeB). The specifications of LTE also include the possibility to have an E-UTRAN base station to provide home or small area coverage for a limited number of users. This base station is called HeNB (Home eNodeB) in this document. For UTRAN (WCDMA) this type of home access point is called HNB (Home NodeB). The LTE HeNBs are used to exemplify the home base stations in the examples below.

The HeNB would provide normal radio coverage for the end users and would be connected to the mobile core network using some kind of IP based transmission. The radio coverage provided is called femtocell in this document.

One of the main drivers of this new concept of providing Local Access is to provide cheaper call or transaction rates/charges when connected via the HeNB compared to when connected via the eNB. Another driver is reducing the load on the operator's eNBs and backhaul connections, thereby reducing the operator's capital and operating expenditures.

The HeNB would in most cases use the end user's already existing broadband connection (e.g. xDSL, Cable) to achieve connectivity to the operator's mobile core network and possibly to other eNBs/HeNBs. Over the broadband connection and other possible intermediate IP networks (e.g. the internet) a HeNB communicates with the core network nodes in the operator's network via an IPsec tunnel (Internet Protocol security architecture according to RFC 4301), which is established between the HeNB and a Security Gateway (SEGW), which protects the border of the operator's network.

FIG. 1 shows an exemplary LTE/SAE network with both femto 130 and macrocells 100 and their associated HeNBs 140 and eNBs 110. The HeNBs 140 are connected to the CN 170 via the HeNB Concentrator Node 160 also referred to as HeNB Gateway (HeNB GW) wherein the S1 interface 150 is used. Also, the eNBs 110 are connected to the CN 170 by using the S1 interface 120.

The main reasons for having a HeNB GW 160 between the HeNBs 140 and the CN 170 are due to the following three main issues:
1. The assumed number of HeNBs in a network is very high (millions of HeNBs is one estimate).
2. End users may switch on and off the HeNB frequently causing increased signaling load.
3. HeNBs may be tampered with (e.g. malicious/modified software).

The first issue creates a possible scaling problem on the core network (CN) side as each HeNB will have its own S1 interface towards the CN and it is assumed that the Mobility Management Entities (MMEs) of the CN are not capable of handling millions of S1 interfaces.

The second issue creates a possible signaling load problem on the CN side and this mostly in the MME due to HeNB S1 interfaces being frequently disconnected and reconnected.

The third issue creates a possible security problem in both the MME and Serving GW as any HeNB that is able to establish an IPsec tunnel to the SEGW (Security Gateway) of the operator's network may attack these nodes.

The HeNB GW is needed to solve these scaling, signaling load and security issues.

In the SAE/LTE 3GPP standards a concept known as CSG (Closed Subscriber Group) has been introduced (and it may also be introduced in the WCDMA/UTRAN 3GPP standard). With CSG, particular HeNBs can be associated to certain wireless terminals (also known as user equipments (UEs)) meaning that only these associated UEs are allowed to access the HeNBs. (A CSG is actually associated with a group of subscribers rather than UEs, but for simplicity the term UE will often be used as the entity of which a CSG is formed.) The allowed CSG Identities (CSG-ID) are stored in the UE in a so called CSG Whitelist. Each HeNB broadcasts in System Information (SI) both a "CSG Indicator" (Boolean type of indicator) and the CSG-ID allocated to it. This means that a UE can determine by reading the CSG-ID from the SI and comparing this to the contents of the CSG Whitelist whether it is allowed to access a particular HeNB. The allowed CSGs for a UE are also stored in the CN, so that the CN can perform an ultimate access control, e.g. in case a UE has an outdated CSG Whitelist or misbehaves (e.g. a hacked UE). One possible way to store the CSG Whitelist in the CN is to have it as part of the subscription/UE profile in the HSS (Home Subscriber Server). In this way it could be downloaded to the MME with the rest of the subscription information and the MME could perform the ultimate access control based on this information.

A new principle has been introduced for location registration in the SAE/LTE networks. This principle is based on a Tracking Area (TA) concept in a similar way as Location Areas (LA) and Routing Areas (RA) in GSM and WCDMA networks. Each SAE/LTE cell belongs normally to a single TA (if not considering RAN sharing deployments) and the Tracking Area Identity (TAI) is broadcasted as part of the SI. The current assumption is that the TAI will consist of a Mobile Country Code (MCC), a Mobile Network Code (MNC) and a Tracking Area Code (TAC).

The main difference from the LA/RA concepts is that in the TA concept of the SAE/LTE networks multiple TAs or a TAI List has been introduced. This means that the network may return a TAI List to the UE as part of some EMM (EPS Mobility Management) procedures like Attach, Tracking Area Update (TAU) and GUTI (Globally Unique Temporary Identity) Reallocation. As long as the UE camps on a cell belonging to a TA whose TAI is included in the TAI List, the UE does not perform normal TAUs (periodic TAUs are still performed). The UE performs normal TAU only when it moves to a cell that doesn't belong to a TA in the TAI List. As part of this TAU the UE will receive a new TAI List and the same procedure continues.

This principle is further shown in FIGS. 2a and 2b. FIG. 2a shows the case when the UE 200 has performed e.g. TAU and has received a TAI List of {TA1, TA2, TA3} from the CN. This means that the UE can move within TA1, TA2 and TA3 without performing TAU. In this document the notation TA1, TA2, etc. is used to denote both Tracking Area 1, Tracking Area 2, etc. and the TAIs of these Tracking Areas, depending on the context. For instance, when used to represent the TAI List, then TA1, TA2, etc. represent the TAIs in the list (i.e. the TAIs of Tracking Area 1, Tracking Area 2, etc.), whereas when it is stated that the UE can move freely within TA1, TA2, etc., then the terms TA1, TA2, etc. represent the actual Tracking Areas. The UE 200 in FIG. 2a is also moving towards the TA4 that is further described in FIG. 2b.

In FIG. 2b, the UE 200 performs a TAU (as depicted using two arrows in FIG. 2b) when it moves to a cell belonging to TA4. After a successful TAU in TA4, the UE 200 receives TAI List {TA2, TA3, TA4} from the CN. Now the UE 200 can move within TA2, TA3 and TA4 without the need to perform a TAU.

One purpose with the TAU is to provide information about the UE location to the network. This information can then be used e.g. for paging purposes for mobile terminating transactions i.e. to locate the UE and to establish a signaling connection between the UE and the network. The main principle is that the network needs to page the UE in all the TAs represented by the whole TAI List i.e. in all the cells belonging to any of the TAs whose TAIs are included in the TAI List. For example, considering the scenario above in FIG. 2b, the network would need to page the UE in all cells belonging to TA2, TA3 or TA4.

There are different TA/TAI allocation mechanisms that can be used when femtocells are introduced to the SAE/LTE network. This is further shown in FIG. 3 where some femtocells 300 are shown being introduced in the geographical area covered by the TA1, TA2, TA3 and TA4 of the macrocells. The femtocells are installed by the end users themselves without any intervention from the mobile operator's personnel. This means that it is not really possible to perform cell or TA planning for femtocells as it is normally performed for macrocells. This leads to the assumed approach which is that each femtocell is allocated one TAI from a limited set of dedicated TAIs and that the TAIs need to be reused between different femtocells. These TAIs are not used in the macrocells. Each femtocell is allocated one of these TAIs during an automatic configuration procedure, normally when the HeNB is powered on. Typically a femtocell does not have any neighboring cells which share the same TAI.

SUMMARY

The TA/TAI allocation between macrocells and femtocells results in some problems. If the femtocells are allocated TAIs different from the macrocells and these TAIs are not included in the TAI List while the UE is in the macrocells, a TAU would be performed each time the UE moves from a macrocell to a femtocell. A similar problem exists if the TAIs used in the macrocells are not included in the TAI List while the UE is in the femtocells, i.e. a TAU would be performed each time the UE moves from a femtocell to a macrocell. This effect would be accentuated if the femtocell coverage is poor around the border of the area that the femtocell is intended to cover, e.g. a home. In such case a user walking around in his home may cause 'ping-pong TAUs', as he walks in and out of femtocell coverage in his own home. With an efficient TAI List allocation strategy an MME can mitigate these problems, provided that the MME is aware of how the femtocell TA is located in relation to the macro layer TAs.

Furthermore, generally when an MME selects the TAIs to be included in a TAI List that it allocates to a UE, it chooses TAIs of TAs which it is likely that the UE will move into in the near future (in addition to the TA the UE is currently located in), i.e. TAs which are close to the UE's current location (preferably TAs that are adjacent to the UE's current TA). Again, as noted above, an efficient TAI List building strategy in conjunction with femtocells requires that the MME is aware of the relative locations of femto layer TAs and macro layer TAs.

For femtocells (and their associated femto layer TAs) this is however difficult, since because of the uncoordinated (and to a large extent non-operator controlled) deployment of femtocells, an MME does not know the femtocells' locations in relation to the macrocells. In particular the MME is not aware of the locations of the femto layer TAs in relation to the macro layer TAs.

Hence, a problem in conjunction with femtocells and TAI List allocation is that the MMEs are not aware of the locations of femto layer TAs in relation to macro layer TAs and that this hampers the MMEs' ability to build efficient TAI Lists and employ an efficient TAI List allocation strategy.

The present invention overcomes problems related to uncoordinated deployment of femtocells and enables efficient TAI List allocation strategies.

Thus, the present invention provides method and arrangements for dynamically and automatically obtaining a macro layer TA footprint for a femtocell (e.g. the femtocell's location in relation to the macro layer TAs) and to use this information to minimize signaling load from Tracking Area Updating in conjunction with femtocells. To achieve the desired optimizations without the present invention, the femto layer TA to macro layer TA relations would be required to be configured manually, which would be a huge administration struggle and in practice rendered infeasible not only by its size but also by the uncoordinated and largely non-operator controlled deployment of femtocells.

According to a first aspect of the present invention a method in a network node of a core network of a cellular network is provided. The cellular network comprises at least one femtocell and at least one macrocell, wherein an area covered by the cellular network is divided into a plurality of macro tracking areas (TAs). The network node, e.g. a MME, is configured to be aware of one or more pre-determined home base stations serving one or more pre-determined femtocells which a UE connected to the cellular network are allowed to access. In the method, each of the pre-determined femtocells are associated with a specific femto layer TA, information to obtain an association between the femto layer TA(s) and its (their) neighboring or covering macro layer TAs is retrieved. Further, a list per UE, is created. The list includes macro layer TAs and/or femto layer TAs in which the UE can move without performing a tracking area update, based on the association of each of the pre-determined femtocells with a femto layer TA used in the pre-determined femtocell and the obtained association between the femto layer TAs and their neighboring or covering macro layer TAs, and the created list is sent e.g. to the UE or the HSS. If the list is sent to the HSS, the list can be downloaded from the HSS from another MME if the UE has moved to that another MME. It should also be noted that the association of each of the pre-determined femtocells with a specific femto layer TA may be performed by mapping a respective femtocell identity, e.g. the CSG-ID, for each of the femtocells to a corresponding femto layer TA identity.

According to a second aspect of the present invention a network node connectable to a cellular network is provided. The cellular network comprises at least one femtocell and at least one macrocell, wherein an area covered by the cellular network is divided into a plurality of macro tracking areas (TAs). The network node, which may be a MME, is configured to be aware of one or more pre-determined home base stations serving one or more pre-determined femtocells which a UE connected to the cellular network is allowed to access. Moreover, the network node comprises an association finder for obtaining an association of each of the pre-determined femtocells with a specific femto layer TA, e.g. by mapping a respective femtocell identity such as the CSG-ID for each of the femtocells to a corresponding femto layer TA identity. It comprises further a unit for retrieving information to obtain an association between the femto layer TA(s) and its (their) neighboring or covering macro layer TAs, a unit for creating a list per UE, including macro layer TAs and/or femto layer TAs in which the UE can move without performing a tracking area update, based on the association of each of the pre-determined femtocells with a femto layer TA used in the pre-determined femtocell and the obtained association between the femto layer TAs and their neighboring or covering macro layer TAs, and a sender for sending the created list. The list may be sent to the UE or the HSS. If the list is sent to the HSS, the list can be downloaded from the HSS from another MME if the UE has moved to that another MME.

According to a third aspect of the present invention a base station connectable to a cellular network comprising at least one femtocell and at least one macrocell is provided. An area covered by the cellular network is divided into a plurality of macro tracking areas (TAs) and the cellular network is configured to be aware of one or more pre-determined home base stations serving one or more pre-determined femtocells which a UE connected to the cellular network is allowed to access. The base station is configured to send to a core network node signalling messages comprising at least one of a femto cell identity and a TA identity which enables the core network node to create a list per UE, including macro layer TAs and/or femto layer TAs in which the UE can move without performing a tracking area update. The base station may be an evolved home Node B or a evolved macro Node B.

BRIEF DESCRIPTION OF THE DRAWINGS

FIGS. 5a, 5b and 5c illustrate an embodiment of the present invention.

DETAILED DESCRIPTION

Figure 1:
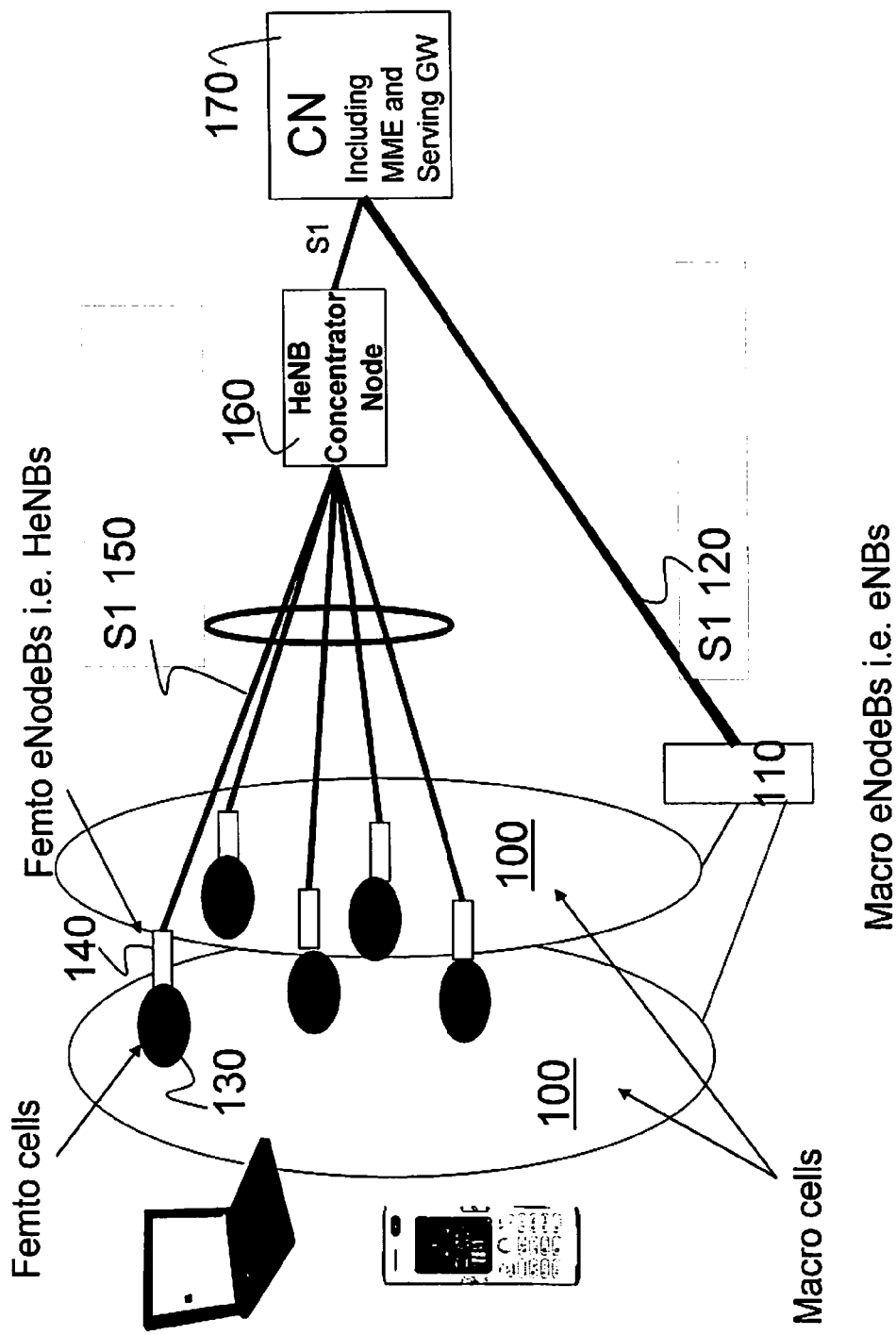
FIG. 1 illustrates a SAE/LTE network with both macrocells and femtocells according to prior art.
Figure 2A:
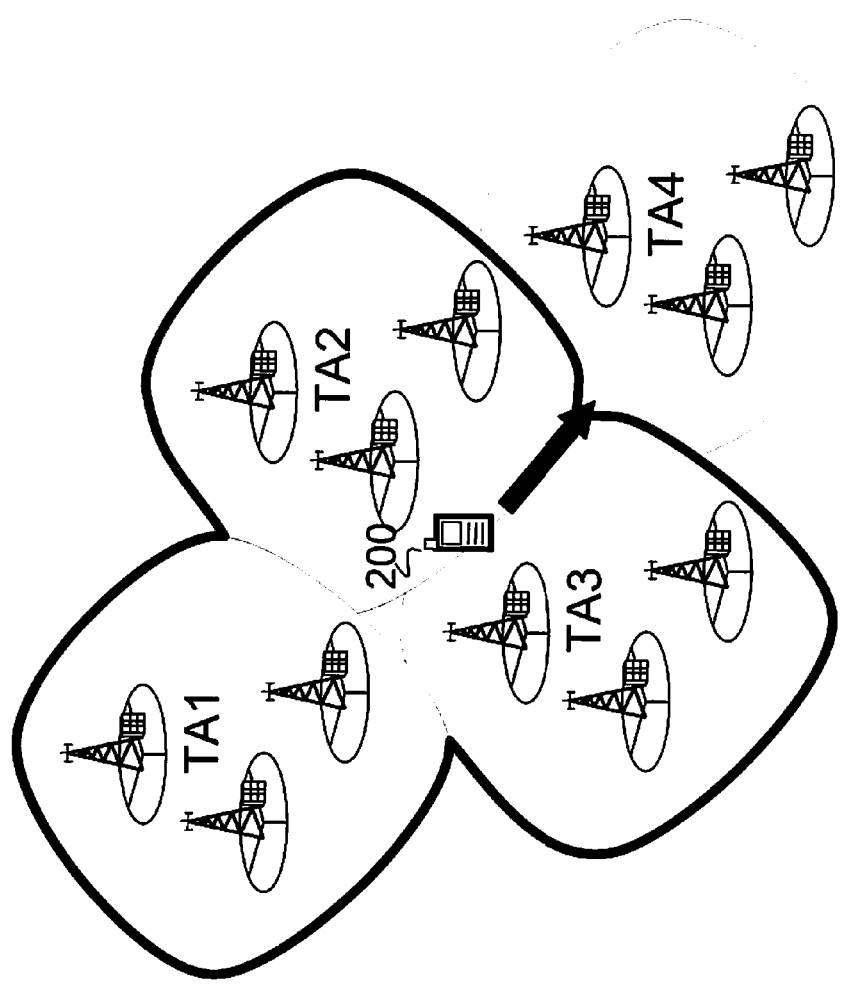
FIG. 2 illustrates a principle of a TAI List according to prior art.
FIG. 2b illustrates another TAI List principle according to prior art.
Figure 2B:
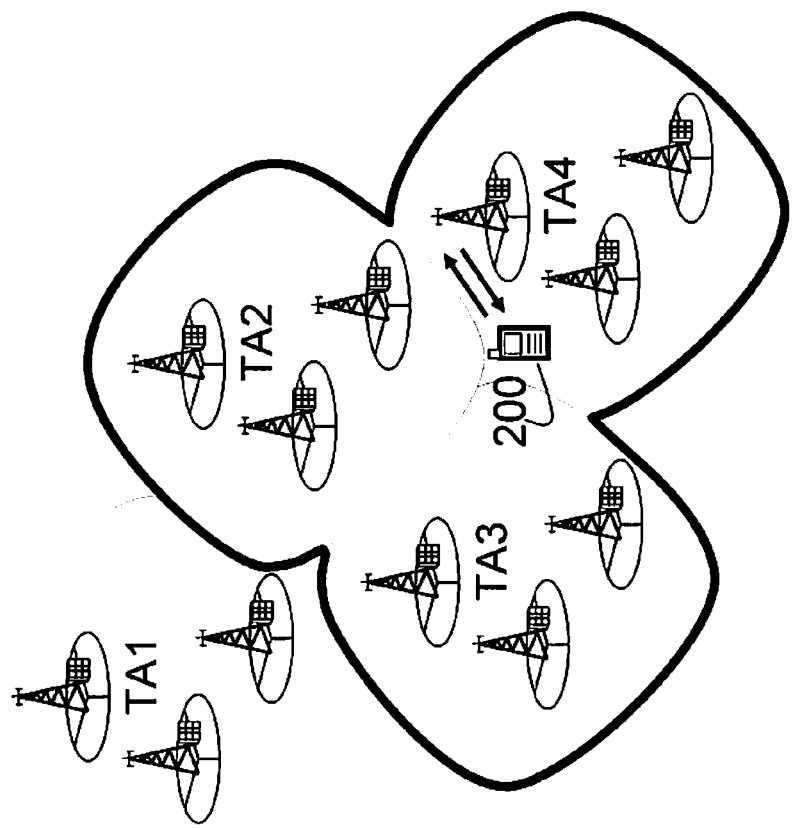
Figure 3:
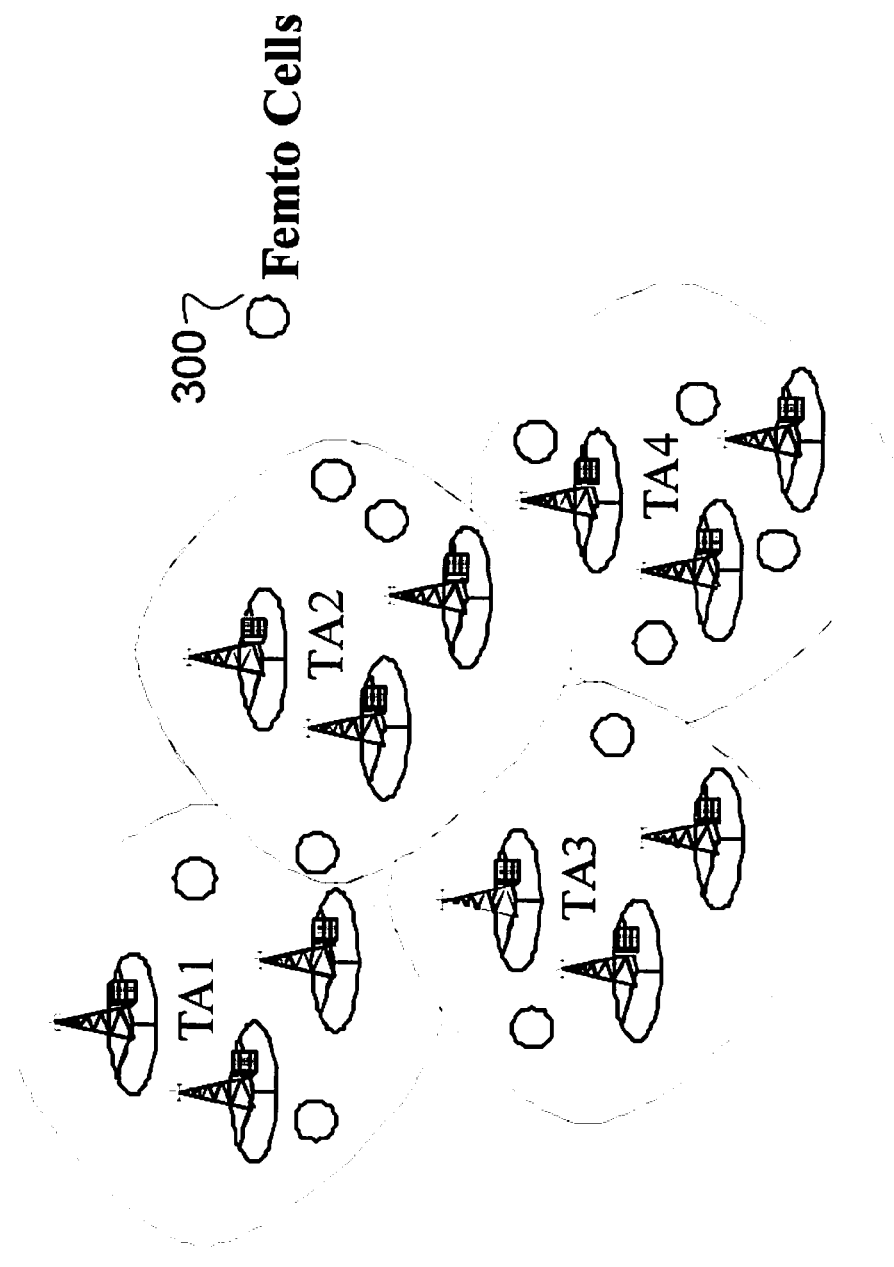
FIG. 3 exemplifies TAI allocation for femtocells according to prior art.

The present invention will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

In the context of this document the following terminology is used:

A femtocell is a cell served by a HeNB and which typically allows access only to a restricted group of subscribers, a so-called closed subscriber group (CSG).

A CSG cell is a cell in which only a restricted group of subscribers, a so-called closed subscriber group (CSG), is allowed access. In the context of this document CSG cell and femtocell are equivalent and used more or less as synonyms. The CSG-ID (e.g. the femtocell identity) is broadcasted in the femto cell and the CSG Whitelist comprises identities of femtocells that the UE is allowed to access.

A Macrocell is a cell in the macro layer.

In the context of this document the term "cell" refers only to the macro layer (and not to a femtocell) and is hence a synonym for macrocell.

A Femto layer TA is a tracking area in the femto layer, which thus is allocated a TAI from the group or range of TAIs which is only used in the femto layer. Note that in the femto layer each femtocell is allocated a femto layer TAI, which is typically reused by a fraction of the femtocells in the network, but whose allocation is not coordinated with other femtocells.

A Macro layer TA is a tracking area in the macro layer, which is thus allocated a globally unique TAI (including a TAC which is unique within the PLMN) from the group or range of TAIs that is not used in the femto layer.

In the context of this document the term "tracking area" or "TA" refers only to the macro layer (and not to a femto layer TA) and is hence a synonym for macro layer TA.

A Femto layer TAI is a TAI which belongs to a group or range of TAIs which is dedicated to the femto layer and which is not allocated to macro layer TAs. TAIs from this group or range are typically reused in an uncoordinated manner among femtocells in a PLMN and are thus typically non-unique within PLMN.

A Femtocell TAI is a TAI allocated to a femtocell, which hence is a femto layer TAI.

In the context of relating femto layer TAs (or femto layer TAIs) to macro layer TAs (or macro layer TAIs) the following concept is introduced:

The macro layer TA footprint for a femtocell consists of the macro layer TA(s) in which (or adjacent to which) the femtocell is located. Note that a macro layer TA footprint may consist of multiple macro layer TAs, if the femtocell is located at a macro layer TA border.

As stated above, the present invention provides methods and arrangements for dynamically and automatically obtaining a macro layer TA footprint for a femtocell, i.e., the femtocell's location in relation to the macro layer TAs and to use this information to minimize signaling load from Tracking Area Updating in conjunction with femtocells. This is further illustrated by the description of the following embodiments related to a cellular network comprising femtocells. The area covered by the cellular network is divided into a plurality of macro TAs and the network comprises network nodes connectable to base stations, home base stations or home base station gateways. Further, the network nodes are configured to be aware of one or more pre-determined femtocells which a UE connected to the network is allowed to access.

Accordingly, when a UE is accessing the network via a femtocell, it is assumed that the serving MME is aware of that the accessed cell is a femtocell. There are several ways for the MME to know that the UE is accessing the network via a femtocell and some of these are listed below. The reason for the access may be a tracking area update (TAU) or another UE triggered Service Request.

1. The MME may know (from configuration) which Tracking Area Identities/Tracking Area Codes that belong to femtocells.
2. The MME may know that the S1 connection from which the UE is accessing is connected to a HeNB (or a HeNB gateway). The MME obtains this knowledge when the S1 connection is established, e.g. through information conveyed from the HeNB/HeNB GW or through configuration from a management system.
3. The MME may know which eNB identities (i.e. the HeNB identities) that belong to femtocells, i.e. some part of the eNB-ID will most likely identify the HeNB GW.
4. The MME knows from the CSG ID (closed subscriber group identity), which may be conveyed from the HeNB or the HeNB GW to the MME, that the UE is accessing the network via a femtocell and which femtocell (or at least its CSG ID) it is. The MME preferably performs CSG-based access control for a UE and the CSG Whitelist for the UE in the MME indicates whether the current cell is an allowed CSG cell for the UE.

Thus, the MME is able to know, according to any of the above identified methods 1-4, that the UE is accessing the network via a femtocell. This is a prerequisite for CSG Whitelist based access control in the MME as well as for application of special charging rates for a UE's femtocell traffic, both of which are network features expected to be introduced in conjunction with femtocells.

Figure 4:
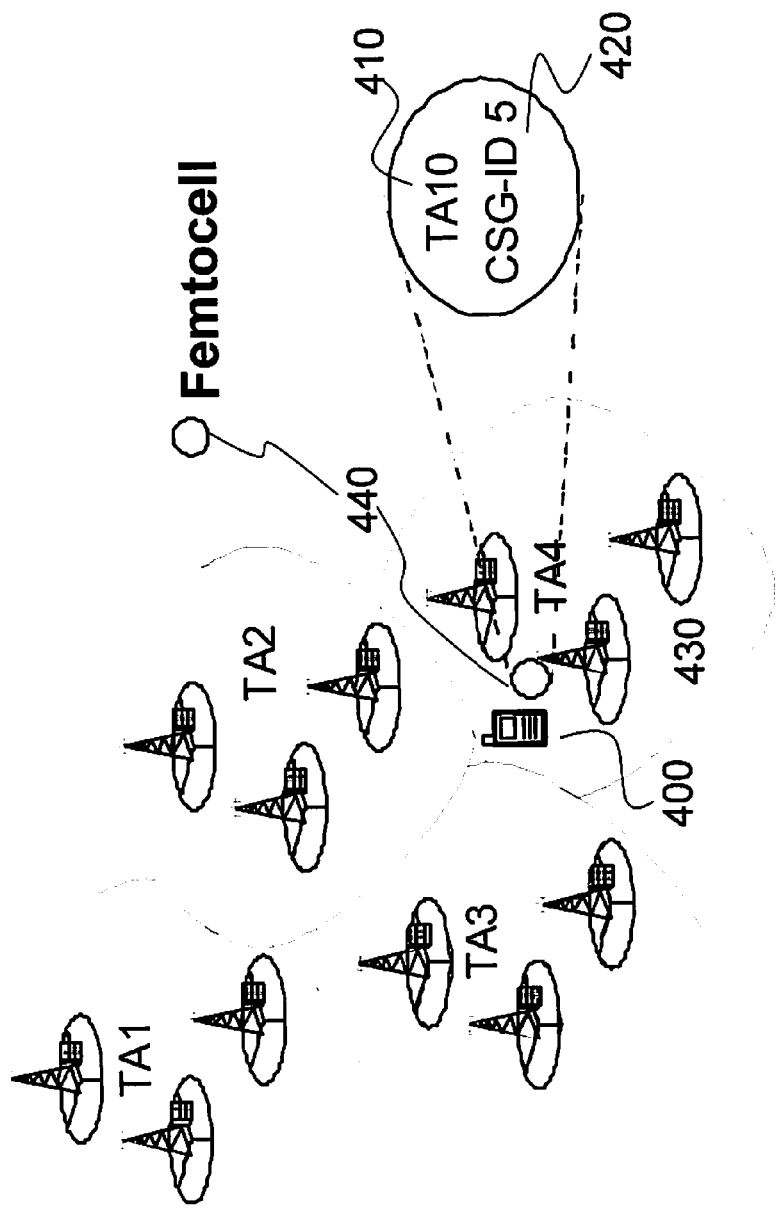
FIG. 4 illustrates an exemplary scenario of embodiments of the present invention.

FIG. 4 is used in the following description as an exemplary scenario. When the UE 400 shown in FIG. 4 initially is in a macrocell according to prior art, the TAI List is {TA2, TA3, TA4}. The femtocell 440 with CSG-ID 5 420 and automatically configured TA 10 410 that is shown in FIG. 4 is an allowed femtocell 440 for this UE 400. One femto layer TA identity (TAI) may be allocated to a plurality of different femtocells, also referred to as CSG cells identified by CSG identities (CSG-IDs).

The MME needs to know the macro layer TA footprint of a femtocell to be able to build efficient TAI Lists in conjunction with the femtocell e.g. for a UE which is allowed to access the femtocell and which is located in or in the vicinity of the femtocell. However, in order to build an efficient TAI list for a UE, based on knowledge of macro layer TA footprints of femtocells, the MME also needs to know which femtocells the UE is allowed to access. This information is provided in the UE's CSG Whitelist which assumedly is accessible to the MME. However, as currently proposed in the 3GPP, the CSG Whitelist only contains the CSG IDs of each allowed femtocell, but neither the cell ID or the TAI of the overlaying or neighboring macrocell nor the TAI of the femtocell. Hence, to facilitate efficient TAI List building in conjunction with femtocells the MME or another corresponding network node should be provided with means to associate femtocells with the femto layer TA used in the respective femtocell. This association may be performed by finding both the CSG-ID and the TAI of a femtocell so that the MME can proactively know the femtocell TAIs corresponding to the CSG-IDs in a UE's CSG Whitelist.

In conclusion, for the macro layer TA footprint of a femtocell, the MME needs, according to an embodiment of the present invention, to know the femtocell TAI-to-macro layer TAI(s) relation i.e. the TAI(s) of the overlaying macrocell(s) must be known for the femtocell, whose TAI must also be known and for the CSG-ID-to-femtocell TAI mapping the MME needs to know both the CSG-ID and the TAI of the femtocell. In relation to FIG. 4, the MME would need to find out that the femtocell with CSG-ID 5 and TA10 is located in macro layer TA4 430 according to this embodiment.

There are different ways to associate a specific femto cell with the femtocell TA used in the specific femto cell in a core network node. According to an embodiment of the present invention, this is achieved by enabling CSG-ID to femtocell TAI mapping in the MME. This mapping can be performed in different ways.

As a first option the network node, e.g. the MME, can learn the mapping between the CSG-ID and the TAI of a femtocell the first time a UE is accessing the network from the femtocell. When the RRC connection has been established between the UE and the HeNB, the HeNB establishes the S1 connection and S1AP context with the selected MME. Subsequently, when the UE sends its first NAS message, e.g. a TAU or a service request, the HeNB is configured to forward this NAS message to the MME in the S1AP INITIAL UE MESSAGE. This S1AP message does not only contain the NAS message but also the TAI which is allocated to the cell the UE is accessing. This provides the MME with the TAI of the femtocell, but it also needs to know the femtocell's CSG-ID (especially since the TAI of a femtocell (normally) is not unique in the network). The S1AP INITIAL UE MESSAGE is currently not specified to include the CSG-ID of the concerned femtocell, but including the CSG-ID in this message would be a way to provide the MME with both the CSG-ID and the corresponding TAI in the same message.

Another way for the network node, e.g. the MME, to learn the CSG-ID to TAI mapping of a femtocell is related to S1-based handover. When a UE performs a S1-based handover (HO) from a macrocell to a femtocell, information about both the target cell CSG-ID (for example in the Target ID IE or in the Source eNodeB to Target eNodeB Transparent Container IE) and target TAI may be included in the signaling towards the MME from the source eNB in the S1AP HANDOVER REQUIRED message. Hence, the eNB is configured to include the target TAI in e.g. the S1AP HANDOVER REQUIRED message.

A third option is that the CSG-ID and TAI of a femtocell are transferred to the network node, e.g. the MME, when the S1 interface between the HeNB and the network node (e.g. via a HeNB GW) is established, which implies that the HeNB is configured to transfer the CSG-ID and TAI of a femtocell. This data may then be included in the S1AP message "S1 SETUP REQUEST". The current specification of the S1 SETUP REQUEST message, which is sent from a (H)eNB to an MME when the S1 interface is established, includes the TAI(s) that the (H)eNB uses, but not the CSG-ID.

A fourth option for the network node, e.g. the MME, to learn CSG-ID to femtocell TAI mapping is that the CSG Whitelist is extended to include the TAI of each included femtocell in addition to the CSG-ID. I.e. when the CSG-ID of a femtocell is included in the CSG Whitelist of a subscriber, the TAI of the femtocell is also included in the CSG Whitelist, associated with the CSG-ID. When the network node retrieves the CSG Whitelist of a UE from the subscriber database, e.g. the HSS, the TAIs associated with the CSG-IDs are included. However, when the CSG Whitelist is conveyed to the UE, the TAIs are not needed and may or may not be removed.

Figure 5A:
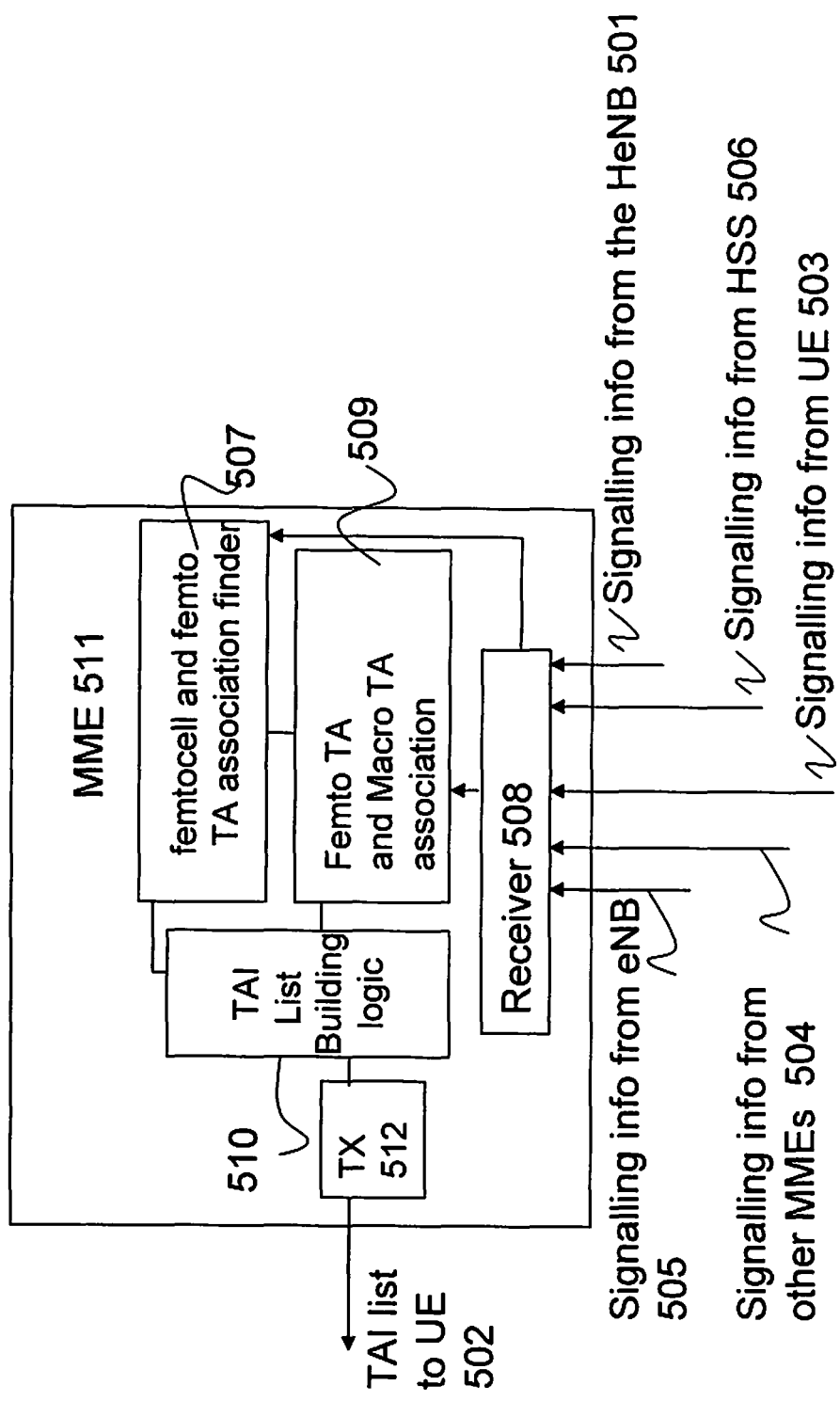

Thus, the network node comprises according to embodiments of the present invention as illustrated in FIG. 5a means for receiving 508 various information 501, 503, 504, 505, 506 from the HeNB, UE, MME, eNB or HSS to obtain the mapping between the CSG-ID and the femtocell TAI and means for 507 performing the mapping by using the methods explained above.

There are also different ways that the network node can obtain an association between the femto layer TAs and their neighboring or covering macro layer TAs, e.g. how the MME can learn the macro layer TA footprint of a femtocell in terms of the femtocell TAI-to-macro layer TAI(s) relation. These methods should preferably be used in parallel with each other, complementing each other, and should not be seen as mutually exclusive alternatives.

According to embodiments of the present invention, three methods are proposed which utilize the TAU procedure or the S1-based handover procedure. The first method is triggered when a UE enters a femtocell (from another TA) and the TAI of the femtocell is not included in the UE's TAI List. The UE then sends a NAS TRACKING AREA UPDATE REQUEST message to the network node, e.g. the MME, via the HeNB. When forwarding this NAS message to the network node the HeNB includes the NAS message in an S1AP INITIAL UE MESSAGE, in which the HeNB also is configured to include the TAI of the femtocell the UE is accessing. Since the NAS TRACKING AREA UPDATE REQUEST message also includes the TAI of the last TA the UE visited (in the "Last visited registered TAI" IE), the network node can conclude that the femtocell the UE is accessing (whose TAI the network node received in the S1AP INITIAL UE MESSAGE) is located inside or adjacent to the macro layer TA with TAI included in the "Last visited registered TAI" IE of the NAS TRACKING AREA REQUEST message. This macro layer TA is therefore a part of the macro layer TA footprint of the femtocell. Note that this method works not only for UEs in idle mode but also for UEs in connected mode, since a UE in connected mode would perform a TAU immediately after a handover to a cell with a TAI that is not included in the UE's TAI List. In the example of FIG. 4, the S1AP INITIAL UE MESSAGE would include TA10 (the TAI of the femtocell) and the NAS TRACKING AREA UPDATE REQUEST would include TA4 (in the "Last visited registered TAI" IE).

The second method is triggered when the UE leaves a femtocell and enters a macro layer TA with a TAI that is not included in the UE's TAI List (e.g. any overlaying or neighboring macro layer TAI if the femtocell TAI was the only TAI in the UE's TAI List). The UE then performs a TAU and this procedure is similar to what was described above for a UE entering a femtocell TA. Hence the network node such as the MME will receive the TAI of the macro layer TA in the S1AP INITIAL UE MESSAGE and the TAI of the femtocell in the NAS TRACKING AREA UPDATE REQUEST message. From this the network node can conclude that the femtocell TA is located inside or adjacent to the macro layer TA. This macro layer TA is therefore a part of the macro layer TA footprint of the femtocell. Note that this method works not only for UEs in idle mode but also for UEs in connected mode, since a UE in connected mode would perform a TAU immediately after a handover to a cell with a TAI that is not included in the UE's TAI List. In the example of FIG. 4, the S1AP INITIAL UE MESSAGE would include TA4 (the TAI of the macrocell) and the NAS TRACKING AREA UPDATE REQUEST would include TA10 (in the "Last visited registered TAI" IE).

The third method is related to S1-based handover. When a UE performs a S1-based handover (HO) from a macrocell to a femtocell, or vice versa, information about both the target cell's CSG-ID (for example in the Target ID IE or in the Source eNodeB to Target eNodeB Transparent Container IE) and target TAI together with the source cell may be included in the signaling towards the network node, e.g. the MME, from the source eNB (in the S1AP HANDOVER REQUIRED message). This implies that the eNB is configured to include said information in a message such as the S1AP HANDOVER REQUIRED message. If all this information is provided to the network node it can conclude the macro layer TA footprint, in a similar manner as in the above two methods, if there is a network database or information that can be used to find out the TAI of the source cell. It could also be so that the source cell and its TAI are already known to the network node (for example due to UE initiated service request or paging response to establish the signaling connection between the UE and the network node). In this case, it is sufficient that the CSG-ID and TAI of the target cell are communicated from the source eNB to the network node in the S1AP HANDOVER REQUIRED message.

The third method can also be applied in the other handover direction i.e. from femtocell to macrocell. In a similar way as above, the TAI of the target macrocell may be signaled to the MME which can thereby learn the macro layer TA footprint as the network node such as the MME also knows the current CSG-cell and its TAI.

It should be noted that in the potentially possible case where the same CSG ID is used in several femtocells, i.e. several femtocells serve the same CSG, the association CSG-ID-femto layer TAI-macro layer TAI could comprise multiple femto layer TAIs and multiple macro layer TAIs for the same CSG ID.

Thus, the network node comprises means 508 for receiving various information 501, 503, 504, 505 from the HeNB, UE, MME and eNB to obtain an association between a femtocell TAI and its neighboring macro layer TAIs, referred to as macro layer TA footprint. Accordingly, the MME comprises means 509 for obtaining said footprint as illustrated in FIG. 5 by using the methods explained above.

As noted above the macro layer TA footprint of a femtocell may consist of more than one macro layer TAI (e.g. if the femtocell is located in the border area of multiple macro layer TAs). The above described methods may therefore be leveraged several times, possibly utilizing several different UEs, and over time the MME will have detected all the macro layer TAIs that are included in the macro layer TA footprint of the femtocell. Still, even after a long period without detecting any new TAIs to add to the macro layer TA footprint, the network node should keep tracking the femtocell's macro layer TA footprint in this way in order to detect future changes caused by changes in the radio network, e.g. deployments of new eNBs or reconfigurations of the TAs. In addition, the macro layer TA footprint may be slightly affected if the HeNB is moved to a different place in a home and it may be entirely changed if the HeNB is moved to an entirely different location, e.g. a summer house. Due to this (potentially) dynamic nature of a macro layer TA footprint, the network node should not only be prepared to include newly detected macro layer TAIs in a macro layer TA footprint, but also to remove a macro layer TAI from the macro layer TA footprint, if the macro layer TAI has not been reported for a long time or after many TAU procedures in which the macro layer TAI could potentially have been reported but was not.

When the network node has acquired both the macro layer TA footprint of its femtocells and the ability to associate the femtocells with the femto layer TA used in the respective femto cell, the network node is equipped with the tools it needs to be able to build efficient TAI Lists for UEs. Hence, when a UE appears in the MME and the MME finds the CSG-ID in the UE's CSG Whitelist, the MME can perform the association UE-CSG ID-femto layer TAI-macro layer TAI and utilize this knowledge to build an efficient TAI list for the UE as described below.

The options described could be implemented in a network solution including MME pools. Since a UE and the UE context would remain with the selected MME, it would be enough to keep the learnt associations (i.e. the footprints) in the MME for most cases. However the MME could update the UE context in the HSS with the association, i.e. the macro layer TA footprint for a femtocell, using existing signaling messages, e.g. the CANCEL_LOCATION_ACK message, to cater for the case that another MME is selected for subsequent access attempts or the case when the UE detaches from the network and later reattaches. Mutual information sharing between the MMEs would be another way to distribute the knowledge between the MMEs of the MME pool. Yet another way to distribute the knowledge between the MMEs of the MME pool is that the MME that has acquired the knowledge of the footprint sends it to the operation and maintenance system, which in turn distribute it to the other MMEs in the MME pool.

The dynamically learnt macro layer TA footprint for a femtocell can be used by the MME as follows. As the MME knows the allowed femtocells for a UE and the related femtocell TAI and overlapping macro layer TA(s), the MME can include the femtocell TAI (e.g. TA10) in the UE's TAI List already when the UE is accessing macrocells in, or close to, an allowed femtocell's macro layer TA footprint (e.g. TA4) and before it has accessed the femtocell. This can be done since the MME knows the macro layer TA footprint for the UE's allowed femtocells as described above. That is, the MME knows that this particular UE has an allowed femtocell with TA10 somewhere in the area covered by e.g. TA4 and when the MME adds TA4 to the TAI List for the UE, it knows that it should also add TA10 to the TAI List.

Another possibility would be that the MME always includes the allowed femtocells in the UE's CSG Whitelist to the TAI List, irrespective of which other TAs are included in the TAI List. In the example of FIG. 4, this would correspond to always adding TA10 to the UE's TAI List.

Another possibility would be that the MME always includes the TAI(s) of the allowed femtocell(s) in the TAI List, irrespective of which other TAIs that were previously included in the TAI List. The MME would however not include any TAI that does not belong to its MME pool. In the example of FIG. 4, this would correspond to always including TA10 in the UE's TAI List.

If the UE enters or accesses the network from an allowed femtocell, the MME may remove from the UE's TAI List the TAIs of all TAs that are not included in the femtocell's macro layer TA footprint (so that in the example of FIG. 4 the TAI List would consist of only TA10 and TA4). It may also add the TAI of any TA which is included in the femtocell's macro layer TA footprint and which were not previously included in the TAI List.

Furthermore, if a UE is turned on in an allowed femtocell (i.e. if there is no valid TAI List when the UE contacts the MME via a femtocell) there is no TAI List to add the femtocell TAI to. Since the MME is aware of the femtocell's macro layer TA footprint, it can then build a TAI List which includes the femtocell TAI and the relevant macro layer TAI(s) (e.g. TA10 and TA4 in the example).

The MME may exclude the femtocell TAI from the UE's TAI List when the UE performs a (normal) TAU or accesses the network in a TA which is not included in the macro layer TA footprint and whose TAI was not included in the TAI List, and the MME consequently allocates a new TAI List to the UE. If the TAI List also includes TAI(s) of one or more TA(s) which is(are) not included in the femtocell's macro layer TA footprint, then the MME may remove the femtocell TAI from the TAI List when the UE performs a periodic TAU or otherwise accesses the network in one of these TAs. In addition, when a UE which has been registered in a femtocell subsequently performs periodic TAU or accesses the network in a macro layer TA which is part of the femtocell's macro layer TA footprint, the MME has the option to remove the femtocell TAI from the TAI List, since this is an indication that the UE has left the femtocell. However, keeping the femtocell TAI in the TAI List as long as the UE remains in macro TAs belonging to the femtocell's macro TA footprint in order to avoid a TAU when (if) the UE re-enters the femtocell (e.g. avoid 'ping-pong TAUs') is probably a more beneficial strategy in most cases.

As stated above and as illustrated in FIG. 5a, the network node, exemplified by an MME, 511 according to embodiments of the present invention comprises an association finder 507 for obtaining an association of each of the pre-determined femtocells with a specific femto layer TA used in the respective pre-determined femtocell and a unit 508 for retrieving information to obtain, by a further association finder 509, an association between the femto layer TAs and their neighboring or covering macro layer TAs. Furthermore, a unit 510 for creating a list per UE, including macro layer TAs and/or femto layer TAs in which the UE can move without performing a tracking area update is provided. The list is created based on the association of each of the pre-determined femtocells with a femto layer TA used in the pre-determined femtocell and the obtained association between the femto layer TAs and their neighboring or covering macro layer TAs. Finally, the network node comprises a sender 512 for providing the created list to the UE 502. In order to be able to build the list, the network node is configured to receive signalling information 501, 503, 504, 505, 506 from HeNBs, UEs, other MMEs, eNBs and HSS.

Accordingly, the present invention also relates to a radio base station 513a, 513b as illustrated in FIGS. 5b and 5c. In FIG. 5b, the radio base station is a home base station, e.g. an HeNB, whereas the radio base station of FIG. 5c is a macro base station, e.g. a eNB. The radio base station may be a macro base station (eNB) or a home base station (HeNB). The radio base station 513a, 513b is configured to send 514a, 514b signalling messages 501; 505 to a core network node 511. The core network node can partly or entirely use these signalling messages 501; 505 for associating each of the pre-determined femtocells with a femto layer TA used in the pre-determined femtocell. As an alternative or in addition, the signalling messages 501; 505 comprise at least some of the information which is used by the core network node to obtain an association between the femto layer TAs and their neighboring or covering macro layer TAs. Hence, the signalling messages may comprise femto cell, macro cell, femto TA and/or macro TA identities which are used to build a list per UE, including macro layer TAs and/or femto layer TAs in which the UE can move without performing a tracking area update. The TA identities may be femto layer TA identities and/or macro layer TA identities.

It should be noted that the term MME is used only for exemplifying an embodiment, and another corresponding network node may also be used in conjunction with the present invention.

Figure 6:
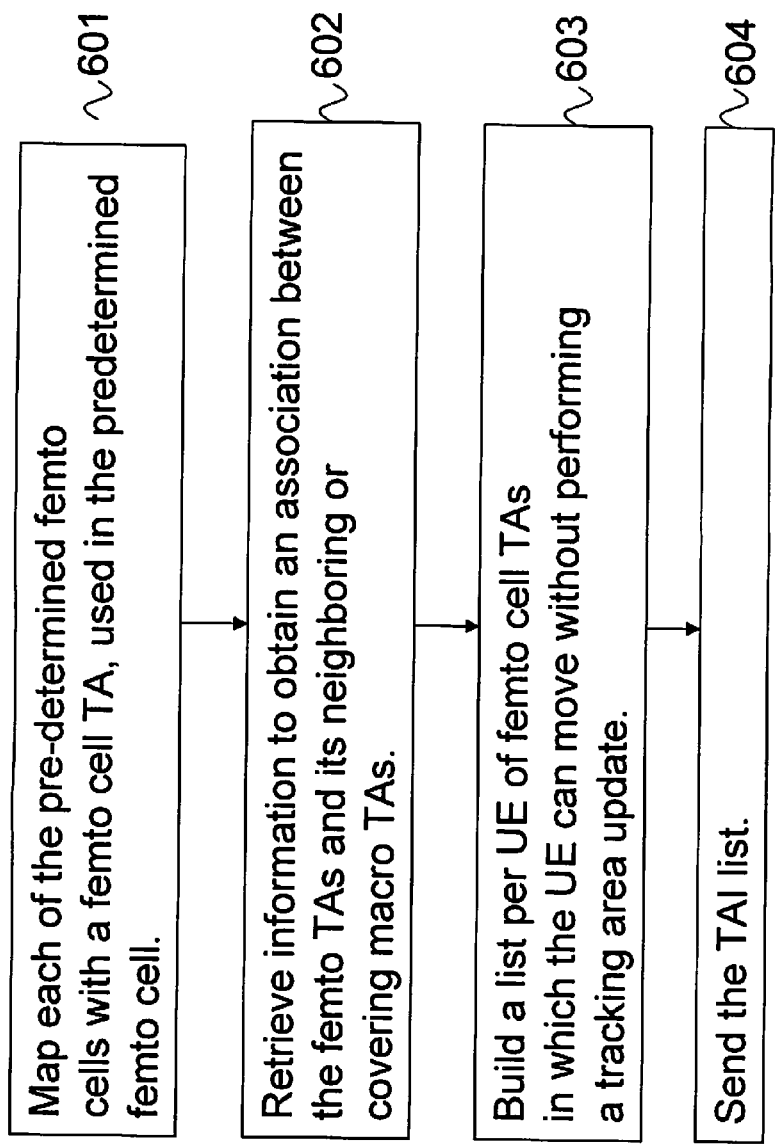
FIG. 6 is a flowchart illustrating a method according to embodiments of the present invention.

In addition, the present invention also relates to a method as illustrated in FIG. 6 comprising the steps of obtaining an association 601 of each of the pre-determined femtocells with a femto layer TA used in the pre-determined femtocell, retrieving 602 information, e.g. the femto layer TAI and the macro layer TAI, to obtain an association between the femto layer TAs and their neighboring or covering macro layer TAs, building 603 a list per UE (e.g. the TAI list), of macro layer TAs and/or femto layer TAs in which the UE can move without performing a tracking area update based on the association of each of the pre-determined femtocells with a femto layer TA used in the pre-determined femtocell and the obtained association between the femto layer TAs and their neighboring or covering macro layer TAs, and sending 604 the list to the UE or the HSS.

In the description above it was assumed that there will be a dedicated group or range of TAIs to be used only in the femto layer. Although this is a highly probable deployment scenario it is not the only conceivable scenario. It may turn out that femtocells and macrocells will be allocated TAIs from the same range. It should then be noted that this would not have any significant impact on the inventive solution as described above, whose mechanisms in principle still would work in the same way.

The concept of CSG cells may also be applied to other cell types than femtocells (e.g. macro, micro and picocells) and the embodiments of the present invention are equally applicable on such cell types. In the appended claims, the term femtocell could encompass any type of CSG cell. Furthermore, it should be understood that even though terminology from SAE/LTE is used in the claims, the claims are intended to cover any mobile communication system which employs similar concepts as CSG and Tracking Area lists.

The present invention is not limited to the above-described preferred embodiments. Various alternatives, modifications and equivalents may be used. Therefore, the above embodiments should not be taken as limiting the scope of the invention, which is defined by the appending claims

The invention claimed is:

1. A method in a network node of a core network of a cellular network comprising at least one femtocell and at least one macrocell, wherein an area covered by the cellular network is divided into a plurality of macro tracking areas, TAs, wherein the network node is configured to be aware of one or more pre-determined home base stations serving one or more pre-determined femtocells which a UE connected to the cellular network is allowed to access, the method comprising:
   obtaining an association of each of the pre-determined femtocells with a specific femto layer TA,
   retrieving information to obtain an association between the femto layer TA(s) and its (their) neighboring or covering macro layer TAs,
   creating a list per UE, including macro layer TAs and/or femto layer TAs in which the UE can move without performing a tracking area update, based on the association of each of the pre-determined femtocells with a femto layer TA used in the pre-determined femtocell and the obtained association between the femto layer TAs and their neighboring or covering macro layer TAs, and sending the created list.

2. The method according to claim 1, wherein the created list is sent to the UE.

3. The method according to claim 1, wherein the created list is sent to a Home Subscriber Server, HSS, connected to the network node and at least one additional network node, such that the created list can be downloaded from the HSS from said at least one additional network node.

4. The method according to claim 1, wherein the association of each of the pre-determined femtocells with a specific femto layer TA is performed by mapping a respective femtocell identity for each of the femtocells to a corresponding femto layer TA identity.

5. The method according to claim 4, wherein the association of each of the pre-determined femtocells with a specific femto layer TA is performed by retrieving a mapping between a femtocell identity and the specific femtocell TA identity the first time a UE is accessing the network from the femtocell.

6. The method according to claim 4, wherein the association of each of the pre-determined femtocells with a specific femto layer TA is performed by using information in S1-based handover signaling.

7. The method according to claim 4, wherein the association of each of the pre-determined femtocells with a specific femto layer TA is performed by receiving the identities of at least one pre-determined femtocell and TA identity of at least one femtocell when the S1 interface between a home base station and the network node is established.

8. The method according to claim 4, wherein the association of each of the pre-determined femtocells with a specific femto layer TA is performed by extending a closed subscriber group whitelist with the TA identity of each included femtocell in addition to the pre-determined femtocell(s) identity (identities).

9. The method according to claim 1, wherein the retrieved information is femto layer TA identity (identities) and macro layer TA identity (identities).

10. The method according to claim 1, wherein the creating is triggered when a UE enters a femtocell from another TA and the TA identity of the femtocell is not included in the UE's TA identity List, wherein a NAS tracking area update request message and associated S1AP signaling is used.

11. The method according to claim 1, wherein the creating is triggered when the UE leaves a femtocell and enters a macro layer TA with a TA identity that is not included in the UE's TA identity List, by using a NAS tracking area update request message and associated S1AP signaling.

12. The method according to claim 1, wherein the creating is performed by receiving a S1AP HANDOVER REQUIRED when a UE is about to perform a S1-based handover from a macrocell to a femtocell, or vice versa.

13. A network node connectable to a cellular network comprising at least one femtocell and at least one macrocell, wherein an area covered by the cellular network is divided into a plurality of macro tracking areas, TAs, wherein the network node is configured to be aware of one or more pre-determined home base stations serving one or more pre-determined femtocells which a UE connected to the cellular network is allowed to access, the network node comprises an association finder for obtaining an association of each of the pre-determined femtocells with a specific femto layer TA, a unit for retrieving information to obtain an association between the femto layer TA(s) and its (their) neighboring or covering macro layer TAs, a unit for creating a list per UE, including macro layer TAs and/or femto layer TAs in which the UE can move without performing a tracking area update, based on the association of each of the pre-determined femtocells with a femto layer TA used in the pre-determined femtocell and the obtained association between the femto layer TAs and their neighboring or covering macro layer TAs, and a sender for sending the created list.

14. The network node according to claim 13, wherein the network node is a Mobility Management Entity, MME.

* * * * *